United States Patent [19]
Fry

[11] Patent Number: 4,635,376
[45] Date of Patent: Jan. 13, 1987

[54] ANGLE MEASURING APPARATUS

[75] Inventor: Andrew R. Fry, Herts, England

[73] Assignee: Crosfield Electronics Limited, London, England

[21] Appl. No.: 693,942

[22] Filed: Jan. 23, 1985

[30] Foreign Application Priority Data

Jan. 23, 1984 [GB] United Kingdom ............... 8401662

[51] Int. Cl.$^4$ ............................................. G01C 9/28
[52] U.S. Cl. ...................................... 33/384; 33/375; 33/DIG. 1; 33/347
[58] Field of Search ............... 33/343, 347, 384, 387, 33/388, 381, 370, 371, 534, 536, 374, 375, 385, 386, DIG. 1

[56] References Cited

U.S. PATENT DOCUMENTS 2,796,673 6/1957 Wells ............................... 33/347 X
2,968,873 1/1961 Holderer ............................. 33/371

FOREIGN PATENT DOCUMENTS 613531 5/1935 Fed. Rep. of Germany ........ 33/182
4348 of 1890 United Kingdom ................. 33/375
128860 7/1919 United Kingdom ................. 33/375

Primary Examiner—Harry N. Haroian
Attorney, Agent, or Firm—Sughrue, Mion, Zinn, Macpeak and Seas

[57] ABSTRACT

Angle measuring apparatus, particularly for measuring doctor blade angle, comprises an elongate support (1); a horizontal level detecting device (4) pivotally connected to an upper surface of the support (1); and means (5, 8) for determining the angle between the support (1) and the horizontal level detecting device (4). An under surface of the support (1) includes a pair of projecting feet (13, 14), the arrangement being such that when the apparatus is placed on a cylinder, the upper surface of the support (1) is substantially parallel with a chord of the cylinder.

3 Claims, 4 Drawing Figures

ANGLE MEASURING APPARATUS

BACKGROUND OF THE INVENTION

The invention relates to angle measuring apparatus for determining the angle a planar surface makes with a cylindrical surface.

In the field of gravure printing, ink is transferred from a reservoir to an engraved cylinder and it is necessary to remove excess ink before contact is made between the ink carrying surface of the cylinder and a record medium. To this end, it is conventional to mount a doctor blade adjacent to the cylinder to removed excess ink and to maintain a constant ink thickness. It has been found that the angle of inclination of the doctor blade to the cylinder critically determines the performance of the printing process and also affects the lifetime of the cylinder. It is therefore desirable to determine this angle.

In the past, the angle has been determined by for example using putty or plasticine but this is very inaccurate.

More accurate, known angle measuring apparatus comprises an elongate support; a horizontal level detecting device pivotally connected to an upper surface of the support; and means for determining the angle between the support and the horizontal level detecting device. Such apparatus is hereinafter referred to as of the kind described.

One example of apparatus of the kind described is the well known clinometer. This is not suitable for determining the inclination angle of a doctor blade to a gravure cylinder in view of the curved form of the cylinder.

SUMMARY OF THE INVENTION

In accordance with the invention, we provide angle measuring apparatus of the kind described which is characterised in that an under surface of the support includes a pair of spaced projecting feet, the arrangement being such that when the apparatus is placed on a cylinder, the upper surface of the support is substantially parallel with a chord of the cylinder.

The provision of a pair of spaced projecting feet enables the angle measuring apparatus to be accurately located at the junction between the doctor blade and the cylinder and spaces the upper surface of the support a sufficient distance from the cylinder so that the upper surface is substantially parallel with a chord of the cylinder.

In order to determine the angle of inclination of the doctor blade, a further measurement must be made and it is preferable if the support comprises two separable sections, one section providing the upper surface of the support and the other section including the projecting feet.

Where two sections are provided, they may be connected in any convenient way but preferably at least one section includes a portion of magnetisable material while the other includes a magnet.

BRIEF DESCRIPTION OF THE DRAWINGS

An example of angle measuring apparatus in accordance with the present invention will now be described with reference to the accompanying drawings, in which.

DETAILED DESCRIPTION OF THE PREFERRED EMBODIMENT

Figure 1:
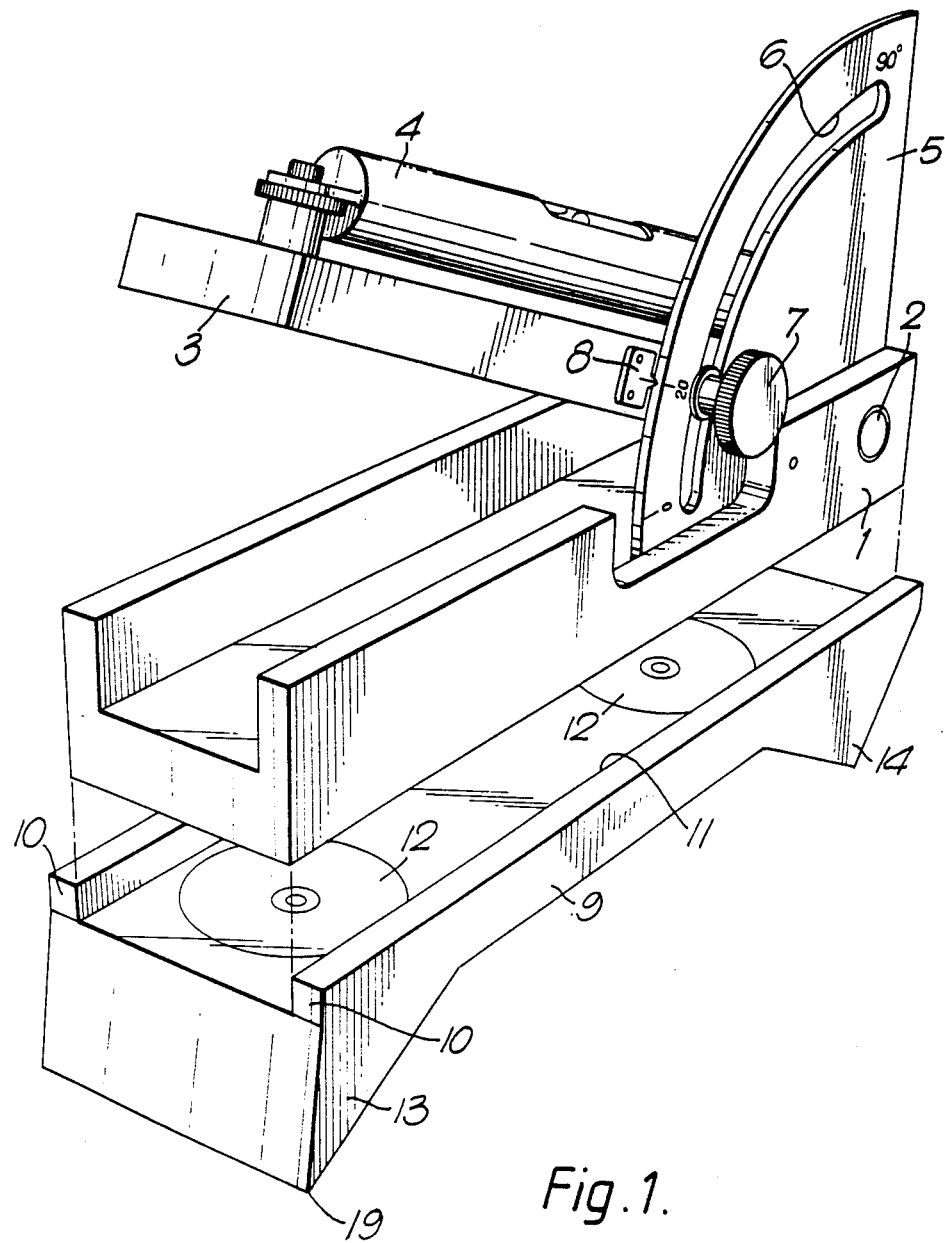
FIG. 1 is a perspective view of the apparatus.

The apparatus illustrated in FIG. 1 comprises a U-shaped metal channel section 1 to which is pivoted at 2 a platform 3 carrying a conventional spirit level 4. A protractor 5 having an arcuate slot 6 is fixed in the channel section 1. A threaded pin (not shown) connected to the platform 3 extends through the slot 6 and a locking nut 7 is screwed to the pin. A pointer 8 is mounted to the platform 3 adjacent to the protractor 5.

A bridge 9 of aluminium or steel has a pair of upstanding integral flanges 10 which define a slot 11 into which the channel section 1 fits. A pair of magnets 12 are mounted in the bridge 9 and attract the channel section 1 towards the bridge 9 to secure the two parts together.

The underside of the bridge 9 includes a projecting foot 13 at one end and a compensating, projecting foot 14 at the other end.

Figure 2:
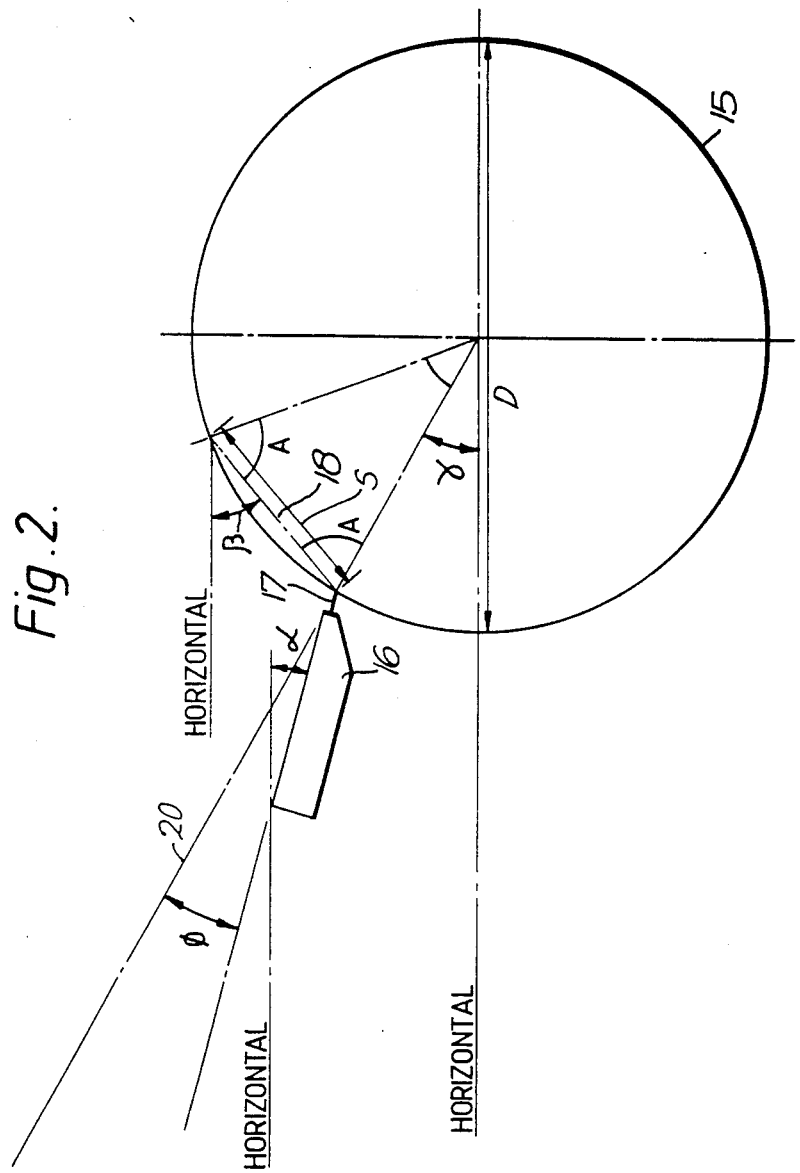
FIG. 2 illustrates diagrammatically how the angle of inclination of the doctor blade is obtained.
Figure 3:
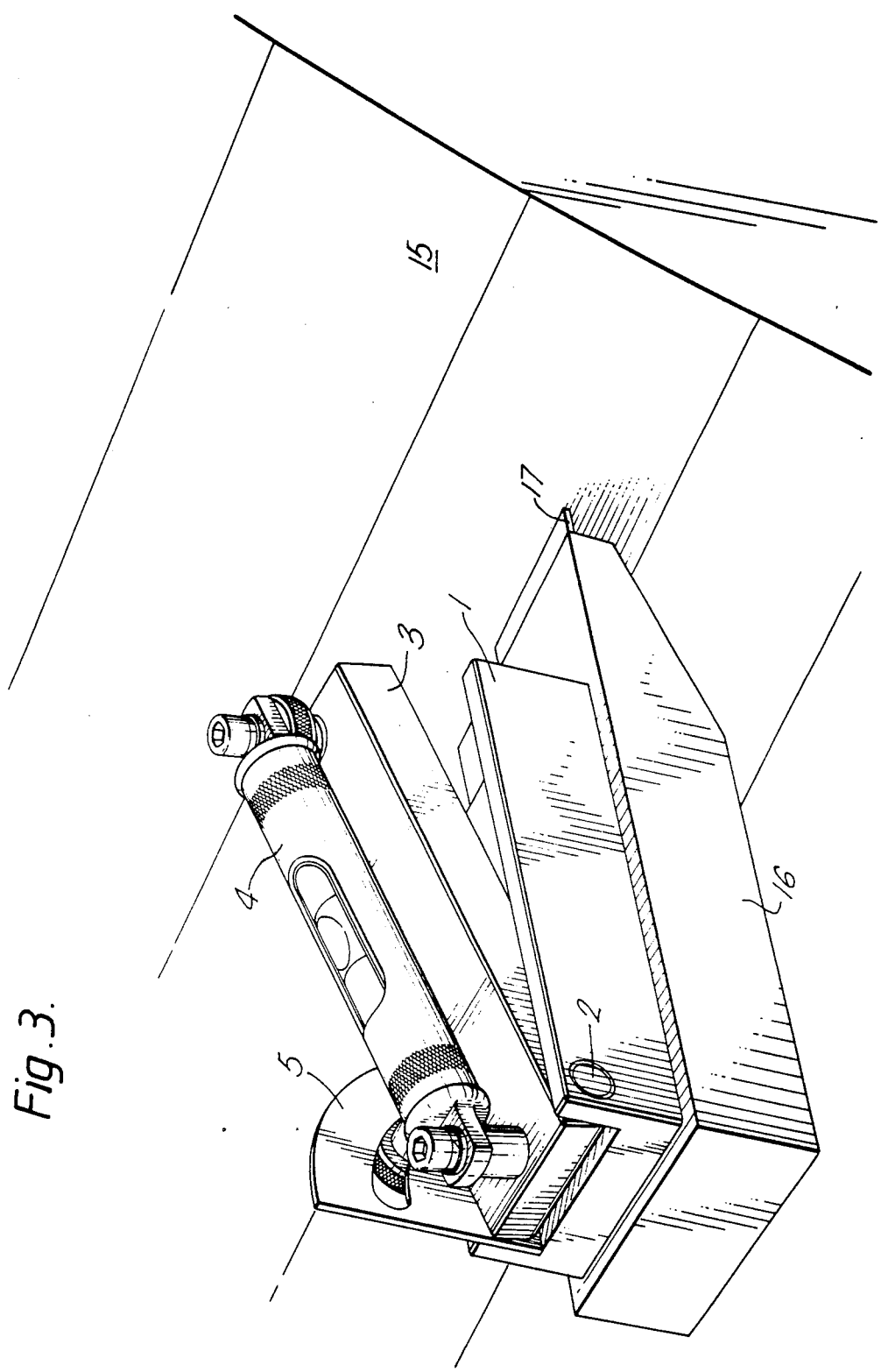
FIGS. 3 and 4 are perspective views of the apparatus associated with a cylinder.

FIGS. 2 and 3 illustrate diagrammatically a gravure cylinder 15 and a carrier 16 which normally carries a doctor blade 17 in use and is movable towards and away from the cylinder 15 to adjust the distance of the doctor blade from the surface of the cylinder 15. The carrier 16 is also pivotable to adjust the angle of inclination of the doctor blade to the surface of the the cylinder 15. In order to determine the angle of inclination of the doctor blade to the surface of the cylinder 15 the doctor blade 17 is brought into engagement with the cylinder surface from its normal position of between 1 and 4 mm from the cylinder surface. The bridge 9 of the angle measuring apparatus shown in FIG. 1 is separated from the remainder of the apparatus and the channel section 1 is placed on the upper surface of the carrier 16 with the pivot 2 adjacent the end of the carrier 16 remote from the cylinder surface. The locking nut 7 is then loosened and the platform 3 raised until the spirit level 4 indicates that the platform 3 is horizontal at which point the locking nut 7 is tightened. This is shown in FIG. 3. The angle of inclination of the platform 3 to the channel section 1 is then determined by a reference to the pointer 8 and this is the angle $\alpha$ shown in FIG. 2.

Figure 4:
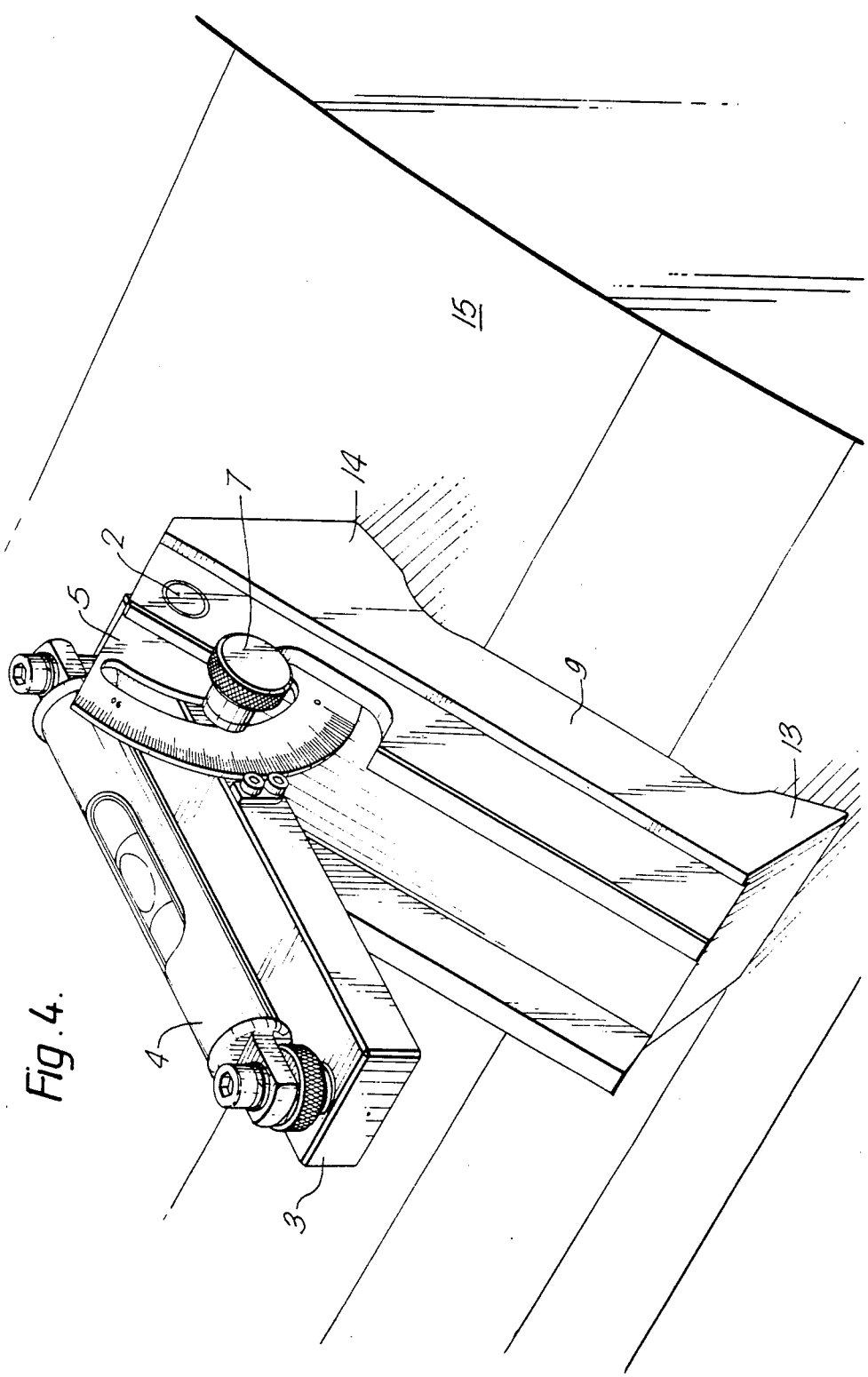

The bridge 9 is then reassembled with the channel section 1 and the complete apparatus placed on the surface of the cylinder with the foot 13 at the junction between the doctor blade and the cylinder 15. This is shown in FIG. 4 in which the doctor blade 17 and carrier 16 have been omitted for clarity. At this position, the upper surface of the channel section 1 is parallel with a chord 18 of the cylinder 15. The presence of the foot 14 prevents the underside of the bridge 9 from contacting the cylinder 15 except at each foot. The foot 13 is shaped so as not to foul any part of the support mechanism of the doctor blade, and to give a relatively sharp 'knife-edge' 19 so as to tuck into the angle between the blade and the cylinder. Note that with very sharp angles of contact the foot 13 would have to have an included angle at the 'knife-edge' more acute than the angle of contact—although in all normal cases in the printing industry the 'knife-edge' angle shown of about 40° would be adequate.

With the apparatus in position as described, the locking nut 7 is again loosened and the platform 3 raised until the spirit level 4 indicates that the platform is horizontal. The angle indicated by the pointer 8 is then noted and this is the angle $\beta$ shown in FIG. 2.

It can be shown geometrically that:

$$\beta = A - \gamma \quad (1)$$

$$\gamma = \phi + \alpha \quad (2)$$

Combining these two equations gives:

$$\phi = A - (\alpha + \beta) \quad (3)$$

where $\phi$ is the required doctor angle (as shown in FIG. 2).

If the calculated value of $\phi$ is negative, for example $\phi = -10°$, this indicates $\phi$ is above the normal 20, not below as shown in FIG. 2.

The angle A is determined empirically from the length (S) between the feet 13, 14 of the bridge 9 (bridge span) and the diameter (D) of the cylinder 15. In one example, the angle A is 70°.

Angle A is determined thus:

$$\text{Cosine}^{-1} A = \frac{\text{bridge span (S)}}{\text{diameter of cylinder (D)}}$$

I claim:

1. An angle measuring apparatus, comprising: an elongate support defining an upper surface and an under surface; said under surface of said support including a pair of spaced downwardly projecting feet (13, 14), each foot tapering towards a single linear edge oriented transverse to a longitudinal axis of said support, said edges being defined in a common plane such that when said apparatus is placed on a cylinder said common plane is substantially parallel with a chord of the cylinder; a horizontal level detecting device (4) pivotally connected (2) to said upper surface of said support such that said horizontal level detecting device defines an angle with said common plane; and means (5-8) for determining said angle between said common plane and said horizontal level detecting device, wherein said support comprises two separable sections, one section (1) providing said upper surface of said support and defining a planar under surface parallel with said common plane when said sections are assembled, and the other section (9) including said projecting feet, said angle determining means enabling the angle between said horizontal level detecting device and said under surface of said one section to be determined.

2. Apparatus according to claim 1, further comprising magnetic means, wherein said two sections are secured together by said magnetic means.

3. A method of determining the angle of inclination of a planar surface to a cylindrical surface, the method comprising mounting angle measuring apparatus on the cylindrical surface, the angle measuring apparatus including an elongate support defining an upper surface and an under surface; said under surface of said support including a pair of spaced downwardly projecting feet, each foot tapering towards a single linear edge oriented transverse to a longitudinal axis of said support, said edges being defined in a common plane such that when said apparatus is placed on a cylinder said common plane is substantially parallel with a chord of the cylinder, a horizontal level detecting device pivotally connected to said upper surface of said support such that said horizontal level detecting device defines an angle with said common plane; and means for determining said angle between said common plane and said horizontal level detecting device, wherein said support comprises two separable sections, one section providing said upper surface of said support and defining a planar under surface parallel with said common plane when said sections are assembled, and the other section including said projecting feet, said angle determining means enabling the angle between said horizontal level detecting device and said under surface of said one section to be determined, one of said feet being positioned at a junction between the planar surface and the cylindrical surface and the other foot resting on the cylindrical surface at a position spaced from said junction such that said common plane is substantially parallel with a chord of said cylindrical surface, adjusting said horizontal level detecting device until said device is horizontal and determining the angle between said horizontal level detecting device and said common plane, detaching said one section of said angle measuring apparatus from said other section and positioning said planar under surface of said one section on said planar surface, adjusting said horizontal level detecting device to be horizontal, determining the angle between said horizontal level detecting device and said planar under surface of said one section, and calculating from said determined angles and the dimensions of the angle measuring apparatus the angle of inclination of the planar surface to the cylindrical surface.

* * * * *